United States Patent
Sadovsky

(10) Patent No.: US 9,876,761 B2
(45) Date of Patent: Jan. 23, 2018

(54) METHOD AND SYSTEM FOR DETERMINING AN ADDRESS CORRESPONDING TO A MOST PROBABLE PHYSICAL LOCATION OF AN ELECTRONIC DEVICE ASSOCIATED WITH A USER

(71) Applicant: YANDEX EUROPE AG, Lucerne (CH)

(72) Inventor: Aleksandr Anatolievich Sadovsky, Moscow (RU)

(73) Assignee: YANDEX EUROPE AG, Lucerne (CH)

(*) Notice: Subject to any disclaimer, the term of this patent is extended or adjusted under 35 U.S.C. 154(b) by 0 days.

(21) Appl. No.: 15/516,043

(22) PCT Filed: Nov. 19, 2015

(86) PCT No.: PCT/IB2015/058953
§ 371 (c)(1),
(2) Date: Mar. 31, 2017

(87) PCT Pub. No.: WO2017/001904
PCT Pub. Date: Jan. 5, 2017

(65) Prior Publication Data
US 2017/0244669 A1    Aug. 24, 2017

(30) Foreign Application Priority Data

Jun. 30, 2015 (RU) ................................ 2015125964

(51) Int. Cl.
*H04L 29/12* (2006.01)
*H04L 12/26* (2006.01)

(52) U.S. Cl.
CPC ............ *H04L 61/609* (2013.01); *H04L 43/04* (2013.01)

(58) Field of Classification Search
CPC ........................ G06Q 10/06311; H04L 61/609
See application file for complete search history.

(56) References Cited

U.S. PATENT DOCUMENTS 6,756,913 B1    6/2004 Ayed
6,757,544 B2    6/2004 Rangarajan et al.
(Continued)

FOREIGN PATENT DOCUMENTS

RU    2368105 C2    9/2009
WO    2006116549 A2    11/2006
WO    2011088233 A1    7/2011

OTHER PUBLICATIONS

International Search Report with regard to PCT/IB2015/058953 dated Feb. 10, 2016.
(Continued)

*Primary Examiner* — Andrew Georgandellis
(74) *Attorney, Agent, or Firm* — BCF LLP

(57) ABSTRACT

A method of determining an address corresponding to a most probable physical location of an electronic device associated with a user is executable on a computer device and comprises receiving geolocation data from the electronic device. Based on received geolocation data, at least two probable physical locations of the electronic device will be found, with each of the at least two probable physical locations corresponding to a physical entity. Each physical entity is selected from a predetermined list and is associated with a physical entity type. A user interaction history is established, with respect to the at least two physical entities.

20 Claims, 5 Drawing Sheets

(56) References Cited

U.S. PATENT DOCUMENTS

| | | | |
|---|---|---|---|
| 7,231,305 B2 | 6/2007 | Stephenson et al. | |
| 8,200,247 B1 * | 6/2012 | Starenky | G01C 21/28 |
| | | | 455/404.2 |
| 8,463,424 B2 | 6/2013 | Dicke | |
| 8,630,663 B1 | 1/2014 | Hawkins et al. | |
| 8,736,442 B2 | 5/2014 | Zazula | |
| 8,756,222 B1 | 6/2014 | Vyas et al. | |
| 8,855,679 B2 | 10/2014 | Nair et al. | |
| 8,874,713 B1 * | 10/2014 | Herring | H04W 4/028 |
| | | | 701/411 |
| 2003/0022673 A1 * | 1/2003 | Bantz | H04L 69/329 |
| | | | 455/456.1 |
| 2010/0076968 A1 | 3/2010 | Boyns et al. | |
| 2013/0086072 A1 | 4/2013 | Peng et al. | |
| 2013/0110833 A1 | 5/2013 | Fredericks et al. | |
| 2013/0132140 A1 * | 5/2013 | Amin | G06Q 10/02 |
| | | | 705/7.13 |
| 2014/0164280 A1 | 6/2014 | Stepanenko | |
| 2015/0038162 A1 * | 2/2015 | Duleba | H04W 4/028 |
| | | | 455/456.1 |
| 2015/0113024 A1 | 4/2015 | Howe | |
| 2015/0127744 A1 | 5/2015 | Moreels et al. | |

OTHER PUBLICATIONS

International Preliminary Report on Patentability with regard to PCT/IB2015/058953 dated Jun. 24, 2016.

* cited by examiner

METHOD AND SYSTEM FOR DETERMINING AN ADDRESS CORRESPONDING TO A MOST PROBABLE PHYSICAL LOCATION OF AN ELECTRONIC DEVICE ASSOCIATED WITH A USER

CROSS-REFERENCE

The present application claims priority to Russian Patent Application No 2015125964, filed Jun. 30, 2015, entitled "METHOD AND SYSTEM FOR DETERMINING AN ADDRESS CORRESPONDING TO A MOST PROBABLE PHYSICAL LOCATION OF AN ELECTRONIC DEVICE ASSOCIATED WITH A USER" the entirety of which is incorporated herein.

TECHNICAL FIELD

The present technology relates to a method and a system for determining an address corresponding to a most probable physical location of an electronic device associated with a user, and more particularly to a method, executable on a computer device, and to a system comprising a computer device having a processor and a computer suitable information storage medium for communicating with the processor and storing instructions.

BACKGROUND

Many applications for electronic devices provide a service running on a remotely localized computer device which communicates with the electronic device via a mobile communication network. Such services often require the exact physical location of the electronic device.

Some applications are designed to display a geographical map with the exact position of the electronic device overlaid on the geographical map. These applications may be used, for example for ordering a taxi to the address associated with the current position of the electronic device, or for showing additional information associated with the current position of the electronic device, such as a physical entity, its name and address.

In order to locate the position of the electronic device, the geo-sensor of the electronic device is used. The geolocation data detected by the geo-sensor are not precise due to several limitations of the present day geolocation technology. Further, the walls of a building around the electronic device may have a falsifying effect on the detected geolocation data. Therefore, it is difficult to assign the proper address data of a physical entity, such as a building, to the detected geolocation data.

If the user of an electronic device, for example, is in a large hospital at a location which is relatively far away from the entrance area, the position according to the detected geolocation data may be closer to the entrance of a building in the neighborhood of the hospital, than to the entrance area of the hospital. In such a case the address of the building in the neighborhood and not the address of the hospital would be used for calculating the physical location of the electronic device.

Therefore there is a need of a method and system for determining an address corresponding to a most probable physical location of an electronic device associated with a user.

SUMMARY

The object underlying the present technology is to configure a method and system for determining an address corresponding to a most probable physical location of an electronic device associated with a user in such a way that the above drawbacks are mitigated.

According to one aspect of the present technology the object is solved by a method for determining an address corresponding to a most probable physical location of an electronic device associated with a user. The method is executable on a computer device and comprises: receiving geolocation data from the electronic device; based on received geolocation data, finding at least two probable physical locations of the electronic device, with each of the at least two probable physical locations corresponding to a physical entity, with each physical entity being selected from a pre-determined list and associated with a physical entity type; establishing, with respect to the at least two physical entities, a user interaction history; based on the user interaction history, calculating for each physical entity a user specific probability factor, which factor being indicative of a likelihood of the user interacting with each physical entity associated with a respective physical entity type and corresponding to a respective one of the at least two probable physical locations; establishing, with respect to each physical entity, a user non-specific probability factor based on statistical information representative of previous interactions of other users and indicative of the likelihood of the other users interacting with each physical entity associated with the respective physical entity type and corresponding to the respective one of the at least two physical locations; calculating, for each physical entity, a general probability factor based on the user specific probability factor and the user non-specific probability factor; selecting one of the at least two physical entities, having the highest general probability factor, as the most probable physical location of the electronic device, and retrieving an address associated with the selected physical entity; representing the selected physical entity and/or the associated address on a map displayed on a stationary or a mobile electronic device.

By taking account of not only the previous interactions with the at least two physical entities, but rather also of previous interactions with other physical entities corresponding to the same entity type, the number of interactions for calculating the most probable physical entity is much higher, and therefore the calculation is more accurate as well.

Further the implementation of the user non-specific probability factor based on previous interactions of other users, will improve the result as to the selection of the most probable physical location of the electronic device.

The representation of the selected physical entity and/or the associated address on a map is depending on the used service. The representation may be displayed on a stationary device or on a mobile electronic device. For calling a taxi, the address of the selected physical entity will be displayed on the same electronic device in respect of which the physical location has to be determined. For running other services, for example for finding the physical location of an electronic device associated with a friend or a child, the selected physical entity and/or the associated address are/is represented via a map displayed on a stationary electronic device, or a mobile electronic device associated with the person trying to find the friend or the child.

Selecting one of the at least two physical entities additionally includes the step of comparing the general probability factor with a predetermined threshold value. The threshold value may be predetermined and it may also be adjusted depending on the characteristics of the user. This step further improves the accuracy for finding the physical location of the electronic device.

One of the at least two physical entities is selected, if the general probability factor of one of the at least two physical entities is higher than the predetermined threshold value. In case there is only one general probability factor that is higher than the threshold value, it can be acted on the assumption that the general probability factor of the at least one other physical entity is much lower than the general probability factor that is higher than the threshold value. In this case the selection of the physical entity associated with the physical location of the electronic device is straight forward and no further processing is needed.

In an alternative case, i.e. if the general probability factor of several of the at least two physical entities is higher than the predetermined threshold value, further processing is needed. Therefore, selecting one of the at least two physical entities must satisfy the further condition that the physical entity belongs to a group of physical entities associated with the physical entity type having a higher averaged user non-specific probability factor than the other at least one physical entity having a general probability factor higher than the threshold value. In this way selecting one of the at least two physical entities which satisfies the following conditions: i) the general probability factor of several of the at least two physical entities is higher than the predetermined threshold value, and ii) the physical entity belongs to a group of physical entities associated with the physical entity type having the highest averaged user non-specific probability factor. During this processing step, the probability of similar physical entities is taken into account. These similar physical entities are associated with the same physical entity type. That is, if one of that at least two physical entities for example is a hospital, the averaged probability factor of other hospitals will be considered.

It may also happen, that the general probability factor of none of the at least two physical entities is higher than the predetermined threshold value. In this case one of the at least two physical entities will be selected if also a temporal condition is met. It is evaluated whether the interaction of the user takes place in a standard time period or in an ad-hoc time period. These time periods will be explained in more detail herein below.

If the user's interaction takes place during an ad-hoc time period of the user, the physical entity having the highest general probability factor is selected. Alternatively, i.e. if the user's interaction is during a standard time period of the user, the physical entity belonging to a group of physical entities associated with the same physical entity type having the highest averaged user non-specific probability factor, is selected. Therefore, in the first one of these two scenarios selecting one of the at least two physical entities must satisfy the following conditions: i) the general probability factor of none of the at least two physical entities is higher than the predetermined threshold value, ii) the user's interaction is during an ad-hoc time period of the user and iii) the physical entity has the highest general probability factor.

In the second one of the two scenarios, selecting one of the at least two physical entities must satisfy the following conditions: i) the general probability factor of none of the at least two physical entities is higher than the predetermined threshold value, ii) the user's interaction is during a standard time period of the user, and iii) the physical entity belongs to a group of physical entities associated with the physical entity type having the highest averaged user non-specific probability factor.

In some implementations of the present technology, the time period of the user's interaction is taken into account not only if the general probability factor of none of the at least two physical entities is higher than the threshold value, but also when calculating the user specific probability factor, the user non-specific probability factor and the general probability factor. The accuracy of selecting the physical entity associated to the physical location of the electronic device can be improved by taking account of the time period of the user's interaction.

According to the present technology, the time period of the user's interaction comprises a user's standard time period or a user's ad-hoc time period. The user's standard time period may be defined as the time period at which the user is regularly working and/or at which the user is moving on standard itineraries, for example on the way to work or on the way back home from work. This time period usually is somewhere between 7 o'clock in the morning and 7 o'clock in the evening. The time outside such standard time periods may be defined as ad-hoc time period. Also holidays are added to the ad-hoc time period. Interactions of a user more often pertain to the ad-hoc time period than to the standard time period.

The higher the number of data stored in the database is, the more accurate the method according to the present technology is. Therefore, data of user's interactions are stored in a data base together with data associated with the selected physical entity, whereby the stored data comprise time and date of the interaction and the allocation of the time thereof to the user's standard time period or to the user's ad-hoc time period. In one embodiment of the present technology, data of interactions associated with the physical entity are stored only temporarily. As soon as the appropriate user non-specific probability factor of the physical entity has been recalculated, involving this interaction, and restored, the temporarily stored data be erased.

The computer device initiates storing of data in the database. Therefore, the data base is connected to the computer device. This means, there is a data transfer connection between the computer device and the data base.

The data of a user's interaction are needed for calculating the user non-specific probability factor of future interactions of other users, and for calculating the user specific probability factor of future interactions of the same user. Therefore, the data of user's interactions with a physical entity are stored in correlation to the user and in correlation to the physical entity.

According to the present technology, the user non-specific probability factor correlated to a physical entity is calculated from the data stored in correlation to the physical entity, and the calculated user non-specific probability factor is stored in correlation to the physical entity. For each interaction of a user with the physical entity, the user non-specific factor is recalculated and restored in correlation to the physical entity.

The physical location of an electronic device can be determined in different ways. One may localize the wireless local area networks near by. However, the simplest way is to use a geo-sensor of the electronic device for generating the geolocation data received by the computer device.

The predetermined list comprising physical entities associated with physical entity types thereof, and the associated geolocation data of the physical entities are stored in a data base. In this way it is possible to compare the geolocation data sent by the electronic device to the computer device with the geolocation data of the physical entities of the list. The physical entities, the associated physical entity types and the associated geolocation data are stored in a data base. This data base may be the same data base as used for storing the data of interactions stored in correlation with the physical entities. However, there may be also two data bases which are linked together over the name of the physical entity or an ID-number of the physical entity.

Also this data base is connected to the computer device. Therefore, the computer device is able to calculate the needed probability factors by taking account of the data stored in the data base.

The user specific probability factor for the physical entity is calculated while taking account of the data of user's interactions with the physical entity which data have been stored and allocated to the user.

Accordingly, a highly accurate solution is provided, if there are previous interactions of the user with the physical entity. In such a case, it is highly probable that a user wants to order a special service related to a physical entity if the user has done the same in the past.

If no previous user's interactions with a physical entity are stored in the database, no user specific probability factor could be calculated. Therefore, the user specific probability factor for the physical entity is calculated, while taking into account of the data of user's interactions with physical entities belonging to a group of physical entities assigned to the physical entity type and which have been stored and allocated to the user. The basis of stored data for such a group is much broader than for one physical entity only, and it is therefore much more probable to find previous user's interactions. In one embodiment of the present technology, the calculation of the user specific probability factor is performed in two steps: in a first step, data of previous interactions with the physical entity are checked, and only if no data have been found user's interactions with the group of physical entities having the same physical entity type are evaluated in a second step. In another embodiment of the present technology, only the second step is performed for calculating the user specific probability factor. This second step includes the first step, wherein only the weighting of user's interaction with the physical entity is less than in the first step.

In a non-limiting embodiment of the present technology, not only previous user's interactions will be taken into account for calculating the user specific probability factor. Rather also the contact list of the electronic device or another contact list which can be associated with the user, may contain useful information about the importance of the physical entity related to the user. Therefore, the user specific probability factor for the physical entity is calculated, while taking account of the contact list of the electronic device and/or a contact list of a social network.

Although the accuracy of the method implemented in accordance with non-limiting embodiments is very high, there may be still a risk of selecting the wrong physical entity. Therefore, one embodiment of the present technology includes the step of asking for confirmation by the user as to the selected physical entity.

The method of the present technology allows for a plurality of different services. In one embodiment of the present technology, a person may be found by means of the physical location of the electronic device allocated to the person. In another embodiment of the present technology, a user may call a taxi to the physical entity according to the physical location of its electronic device. This application includes sending a taxi to the address associated with the selected physical entity.

According to another aspect of the present technology, the object is solved by a system for determining an address corresponding to a most probable physical location of an electronic device associated with a user. The system comprises a computer device having a processor and a computer usable information storage medium communicating with the processor and storing instructions causing the system to perform the steps of: receiving geolocation data from the electronic device; based on received geolocation data, finding at least two probable physical locations of the electronic device, with each of the at least two probable physical locations corresponding to a physical entity, with each physical entity being selected from a pre-determined list and associated with a physical entity type; establishing, with respect to the at least two physical entities, a user interaction history; based on the user interaction history, calculating for each physical entity a user specific probability factor, which factor being indicative of a likelihood of the user interacting with each physical entity associated with a respective physical entity type and corresponding to a respective one of the at least two probable physical locations; establishing, with respect to each physical entity, a user non-specific probability factor based on statistical information representative of previous interactions of other users and indicative of the likelihood of the other users interacting with each physical entity associated with the respective physical entity type and corresponding to the respective one of the at least two physical locations; calculating, for each physical entity, a general probability factor based on the user specific probability factor and the user non-specific probability factor; selecting one of the at least two physical entities, having the highest general probability factor, as the most probable physical location of the electronic device, and retrieving an address associated with the selected physical entity; sending the selected physical entity and/or the associated address to a stationary or a mobile electronic device.

By taking account not only of the previous interactions with the at least two physical entities but also previous interactions with other physical entities according to the same entity type, the number of interactions for calculating the most probable physical entity is much higher and therefore, also the accuracy of the calculation is highly improved.

Further, the implementation of the user non-specific probability factor based on previous interactions of other users, will improve the result of the selection of the most probable physical location of the electronic device.

The representation of the selected physical entity and/or the associated address on a map is depending on the used service. The representation may be displayed on a stationary device, or on a mobile electronic device. For calling a taxi, the address of the selected physical entity will be displayed on the same electronic device which physical location had to be determined. For running other services, for example for finding the physical location of an electronic device associated with a friend or a child, the selected physical entity and/or the associated address is/are represented via a map displayed on a stationary electronic device or a mobile electronic device associated with the person trying to find the friend or child.

The computer device allows for selecting one of the at least two physical entities by including the step of comparing the general probability factor with a predetermined threshold value. The threshold value may be predetermined or it may also be adjusted depending on the characteristics of the user. This step also improves the accuracy of finding the physical location of the electronic device.

The computer device selects one of the at least two physical entities if the general probability factor of one of the at least two physical entities is higher than the predetermined threshold value. In case that only one general probability factors is higher than the threshold value, it can be acted on the assumption that the general probability factor of the at least one other physical entity is much lower than the general probability factor that is higher than the threshold value. In this case, the selection of the physical entity associated to the physical location of the electronic device is straight forward and no further processing is needed.

In an alternative case, i.e. if the general probability factor of several of the at least two physical entities is higher than the predetermined threshold value, a further processing is needed. Therefore, selecting one of the at least two physical entities must satisfy the further condition that the physical entity belongs to a group of physical entities associated with the physical entity type having a higher averaged user non-specific probability factor than the other at least one physical entity having a general probability factor higher than the threshold value. In this way the computer device selects one of the at least two physical entities which satisfies the following conditions: i) the general probability factor of several of the at least two physical entities is higher than the predetermined threshold value, and ii) the physical entity belongs to a group of physical entities associated with the physical entity type having the highest averaged user non-specific probability factor. During this processing step, the probability of similar physical entities is taken into account. These similar physical entities are associated with the same physical entity type. That is, if one of the at least two physical entities, for example, is a hospital, the averaged probability factor of other hospitals will be considered.

It may also happen, that the general probability factor of none of the at least two physical entities is higher than the predetermined threshold value. In this case one of the at least two physical entities will be selected if also a temporal condition is met. It is calculated whether the interaction of the user takes place in the user's standard time period or in an ad-hoc time period. These time periods were already explained in detail under the above.

If the user's interaction takes place during an ad-hoc time period of the user, the physical entity having the highest general probability factor is selected. Alternatively, i.e. if the user's interaction is during a standard time period of the user, the physical entity belonging to a group of physical entities associated with the same physical entity type having the highest averaged user non-specific probability factor, is selected. Therefore, in the first one of these two scenarios, the computer device selects one of the at least two physical entities if it satisfies the following conditions: i) the general probability factor of none of the at least two physical entities is higher than the predetermined threshold value, ii) the user's interaction is during an ad-hoc time period of the user and iii) the physical entity has the highest general probability factor.

In the second one of these two scenarios, the computer device selects one of the at least two physical entities if it satisfies the following conditions: i) the general probability factor of none of the at least two physical entities is higher than the predetermined threshold value, ii) the user's interaction is during a standard time period of the user, and iii) the physical entity belongs to a group of physical entities associated with the physical entity type having the highest averaged user non-specific probability factor.

Account of the time period of the user's interaction not only is taken into account if the general probability factor of none of the at least two physical entities is higher than the threshold value, but also if the computer device calculates the user specific probability factor, the user non-specific probability factor and the general probability factor. The accuracy of selecting the physical entity associated to the physical location of the electronic device can be improved by taking account of the time period of the user's interaction.

The system comprises a data storage device which is capable of storing a data and connected to the computer device, whereby the data base contains data of user's interactions together with data associated with the selected physical entity in the data base. Further, the stored data comprise time and date of the interaction and the allocation of the time thereof to the user's time period which comprise a user's standard time period and a user's ad-hoc time period.

According to the present technology, the time period of the user's interaction comprises a user's standard time period or a user's ad-hoc time period. The user's standard time period may be defined as the time period at which the user is regularly working and/or at which the user is moving on standard itineraries for example, is on the way to work or on the way back home from work. This time period is usually somewhere between 7 o'clock in the morning and 7 o'clock in the evening. The time outside such standard time periods may be defined as an ad-hoc time period. Also holidays are added to the ad-hoc time period. Interactions of a user more often pertain to the ad-hoc time period than to the standard time period.

The higher the number of data stored in the database is, the more accurate the method according to the present technology is. Therefore, data of user's interactions are stored in a data base together with data associated with the selected physical entity, whereby the stored data comprise time and date of the interaction and the allocation of the time thereof to the user's standard time period or the user's ad-hoc time period. In one embodiment of the present technology data of interactions associated with the physical entity are stored only temporarily. As soon as the appropriate user non-specific probability factor of the physical entity has been recalculated, involving this interaction, and restored, the temporarily stored data of this interaction may be erased.

The computer device initiates storing of data in the database. Therefore the data base is connected to the computer device. This means there is a data transfer connection between the computer device and the data base.

According to the present technology, the user non-specific probability factor correlated to a physical entity is calculated from the data stored in correlation to the physical entity, and the calculated user non-specific probability factor is stored in correlation to the physical entity. For each interaction of a user with the physical entity, the user non-specific factor is recalculated and restored in correlation to the physical entity.

The data of an user's interaction are needed for calculating the user non-specific probability factor of future interactions of other users, and for calculating the user specific probability factor of future interactions of the same user. Therefore, the database contains data of user's interactions with a physical entity in correlation to the user, and in correlation to the physical entity.

The data base contains the predetermined list comprising physical entities associated with physical entity types thereof and the associated geolocation data of the physical entities. In this way it is possible to compare the geolocation data sent by the electronic device to the computer device with the geolocation data of the physical entities of the predetermined list. The data base containing the physical entities, the associated physical entity types and the associated geolocation data may be the same data base as used for storing the data of interactions stored in correlation with the physical entities. However, there may be also two data bases which are linked together over the name of the physical entity or an ID-number of the physical entity.

Also this data base is connected to the computer device. Therefore, the computer device is able to calculate the needed probability factors by taking account of the data stored in the data base.

Although the inventive system works very accurately, there may be still a rest risk for selecting the wrong physical entity. Therefore, in one embodiment of the present technology the computer device sends a request to the electronic device for confirmation by the user as to the selected physical entity.

In one embodiment of the present technology, the data storage device is directly connected to the computer device. This is to say that the data storage device is located close to the computer device and has to be maintained and administrated by the provider of the service. In a non-limiting embodiment of the present technology, the computer device is connected to the data storage device via a communication network. In this way the data storage device will be serviced by a professional data base provider. The provider of the service needs not to take care of backups and other administrative tasks.

A connection between the computer device and the electronic device must be possible at each physical location of the electronic device. Therefore, the computer device is connected to the electronic device via a mobile network. A connection over a mobile network nowadays can be established from almost every physical location.

BRIEF DESCRIPTION OF THE DRAWINGS

The non-limiting embodiments will be more fully appreciated by reference to the accompanying drawings, in which.

The drawings are not necessarily to scale and may be illustrated by phantom lines, diagrammatic representations and fragmentary views. In certain instances, details that are not necessary for an understanding of the embodiments, or render other details difficult to perceive, may have been omitted.

DETAILED DESCRIPTION OF THE NON-LIMITING EMBODIMENT(S)

Reference will now be made in detail to various non-limiting embodiment(s) of the present technology. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

Figure 1:
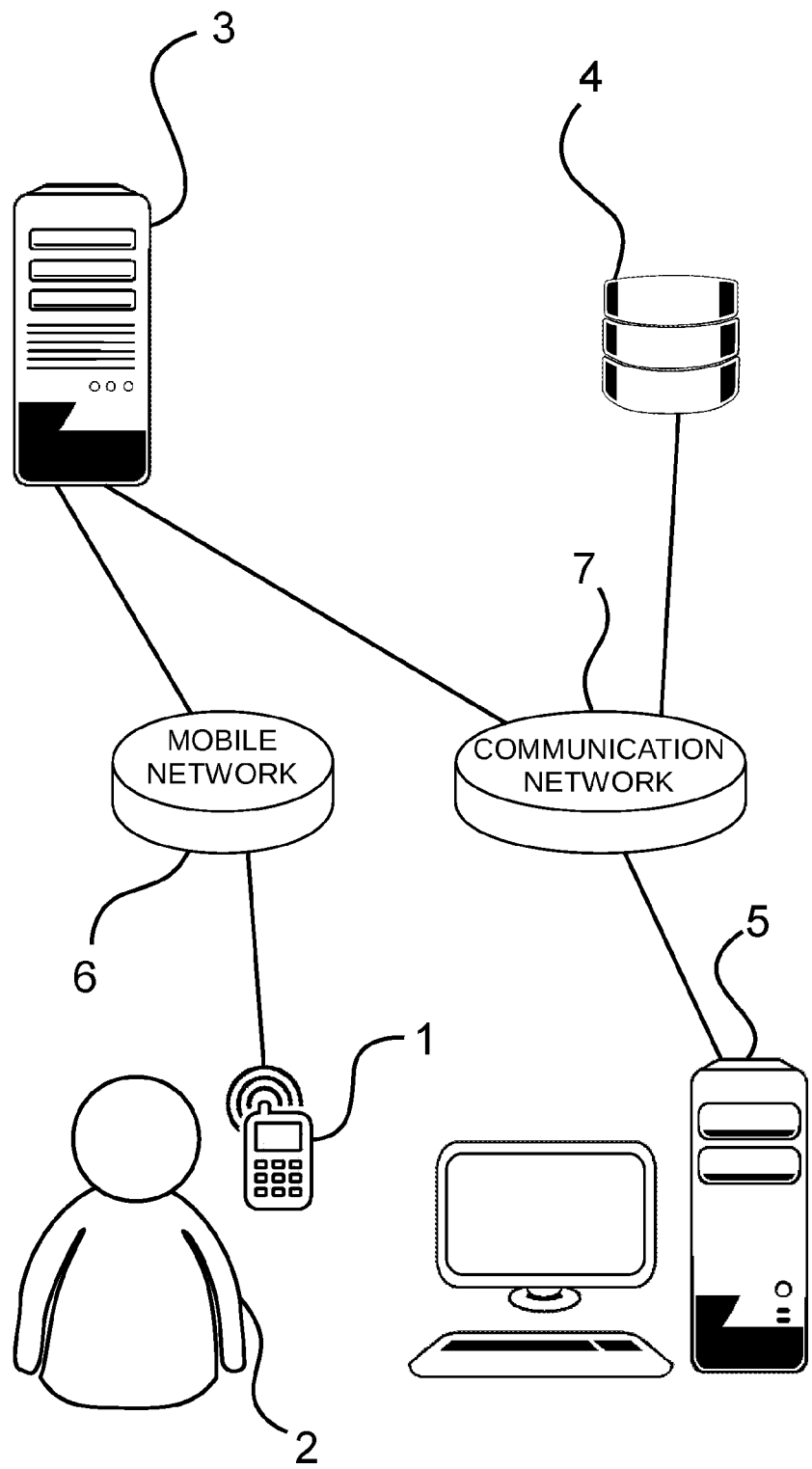
FIG. 1 depicts a schematic diagram of a system for determining an address corresponding to a most probable physical location of an electronic device and for representing a selected physical entity and/or the associated address on a map displayed on a stationary or a mobile electronic device.

FIG. 1 illustrates a system comprising a server 3, a data storage device 4, a desktop computer 5 and a mobile electronic device 1 like a mobile phone. The user of the mobile electronic device 1 is indicated by the reference numeral 2. Server 3, data storage device 4 and desktop computer 5 are connected via a communication network 7, which can be organized as a network cloud for being secured against attacks from the outside. The mobile electronic device 1 and the server 3 are connected via a mobile network 6.

The data storage device 4 contains a first data base for the physical entities of the respective area. The data base includes each physical entity of the respective area, such as private buildings, restaurants, cafés, bars, official buildings, residential buildings, shopping centers, etc., and, for example, a zoological garden. Associated with each physical entity the geolocation data of the physical entity, the address of the physical entity, and an ID associating the physical entity to a physical entity type are stored. Further, a user non-specific probability factor for standard periods p and a user non-specific factor for ad-hoc periods p' are stored in the first database.

A second data base contains the physical entity groups and the associated IDs. In the second data base further an averaged user non-specific probability factor for standard periods $p_{gr}$ and an averaged user non-specific factor for ad-hoc periods $p'_{gr}$ are stored, each associated to a respective physical entity group. The physical entity groups stand for a classification of physical entities. In some embodiments of the present technology, the physical entities can be grouped into the same group based on the physical entities being of the same physical entity type.

A third data base contains all of the registered users. For each user the standard time periods and the ad-hoc time periods of movement of the user are stored. A standard time period, for example, can be every working day from 7 o'clock in the morning, when the user leaves the house for work, to 7 o'clock in the evening, when the user returns back home from work. A standard time period can also be every Saturday, when the user goes to the same shopping center, and every Sunday, when the user goes to church.

All other periods are ad-hoc periods of the user. Also the time period when the user usually is at work is an ad-hoc period during vacation.

A fourth data base contains all interactions associated with a user and a physical entity. An interaction means the use of an offered service, for example, calling a taxi, finding a person, or ordering food. For each interaction, the database includes the user, the time period of the user when calling the service, the physical entity as the physical location of the user, the ID associated with the group of physical entities the physical entity belongs to, and the kind of interaction.

Figure 2:
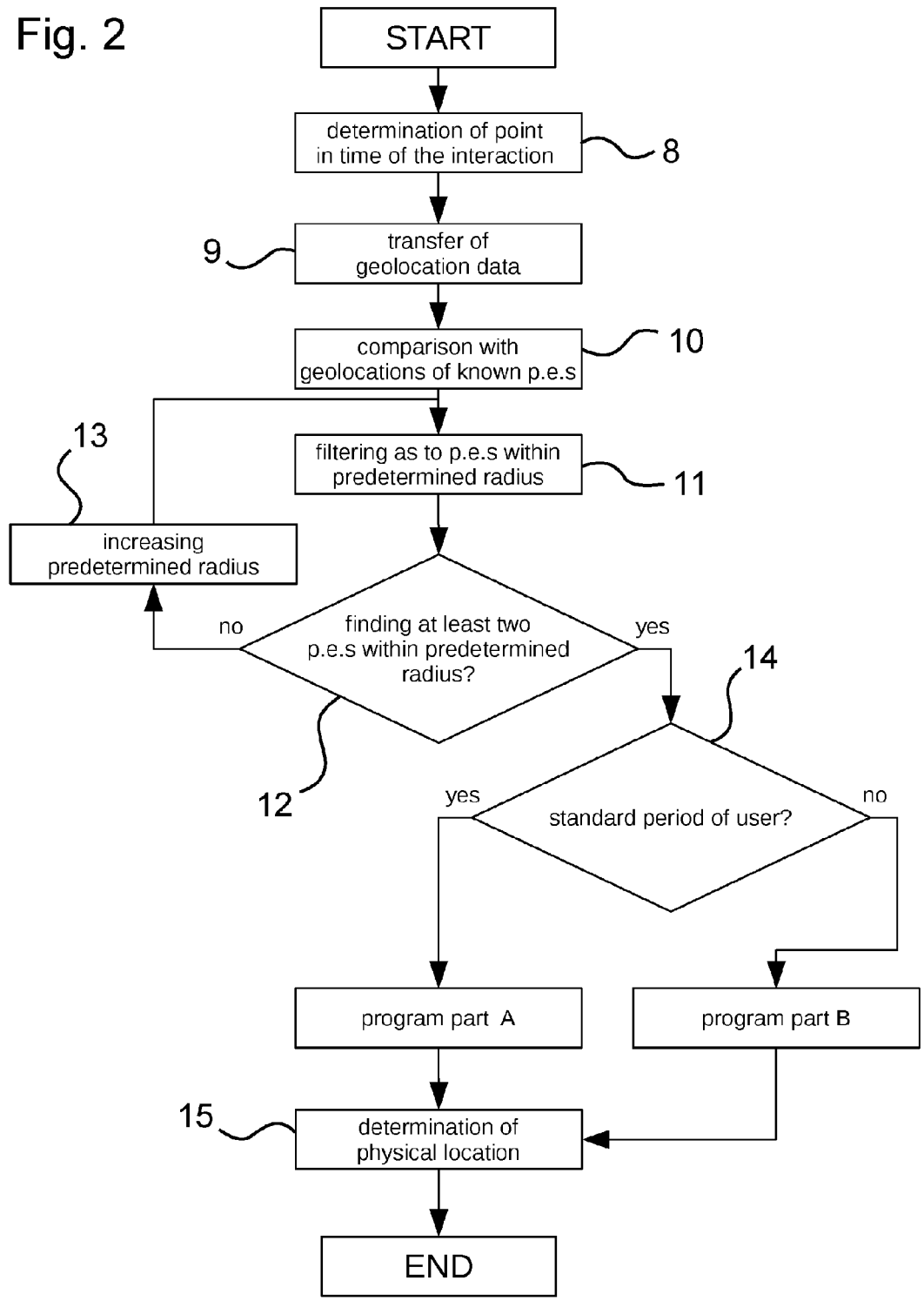
FIG. 2 depicts a flow chart of a main process executed within the system of FIG. 1.

FIG. 2 illustrates a flow chart of the main process for determining an address corresponding to a most probable physical location of an electronic device associated with a user.

Step 8:

The point in time of the interaction is determined. This step includes ascertaining whether the point in time of the interaction is within the standard period, or within the ad-hoc period of the user. To this end data from the third data base are reviewed by comparing the point in time of the interaction with the stored standard periods and the ad-hoc periods of the user. The third data base is stored in the data storage device 4, which is connected to the server 3 via the communication network 7.

Step 9:

The geolocation data of the physical location of the user 2 are transferred from the mobile electronic device 1 to the server 3 via the mobile network 6. This action can be initiated by an app running on the mobile electronic device, or the data are requested through the server 3.

Step 10:

The transferred geolocation data are compared with geolocation data of physical entities (p.e.s) stored in the first data base. The first data base is stored in the data storage device 4 connected to the server 3 via the communication network 7.

Step 11:

The task is to find at least two physical entities which are located near the physical location of the user 2. Therefore, the transferred geolocation data are converted to geolocation data pertaining to a proximate area having a predetermined radius (or another appropriate shape) surrounding the physical location of the user 2. The resulting proximate area data are compared with the geolocation data of the physical entities from the first data base.

Step 12:

It is checked whether at least two physical entities associated with geolocation data within the proximate area having the predetermined radius and surrounding the physical location of the user 2 and the mobile electronic device 1, can be found in the first data base. If no physical entity or only one physical entity can be found within that proximate area, the process will continue with step 13. In the alternative case, i.e. if at least two physical entities can be found in that proximate area, the process continues with step 14.

Step 13:

The transferred geolocation data are converted to geolocation data representing a proximate area having a larger size than the predetermined radius. Hereinafter the process will continue by processing steps 11 and 12 once again. The increase of the radius should not be too large to avoid having too many physical entities within the proximate area of the increased radius. Therefore, in some embodiments, the radius is increased in a number of steps that can be repeated for several iterations.

Step 14:

The process is to be continued in different ways, depending on the time period of the user at which the user requested the service. If the interaction is within the limits of the user's standard period, the process will continue with a program part A. In the alternative case, i.e. if the interaction is within the limits of the user's ad-hoc period, the process will continue with a program part B.

Step 15:

Following the program part A, or, alternatively, the program part B, the process is handed over back to the main program. The most probable physical location of the mobile electronic device 1 associated with a physical entity is determined.

Figure 3:
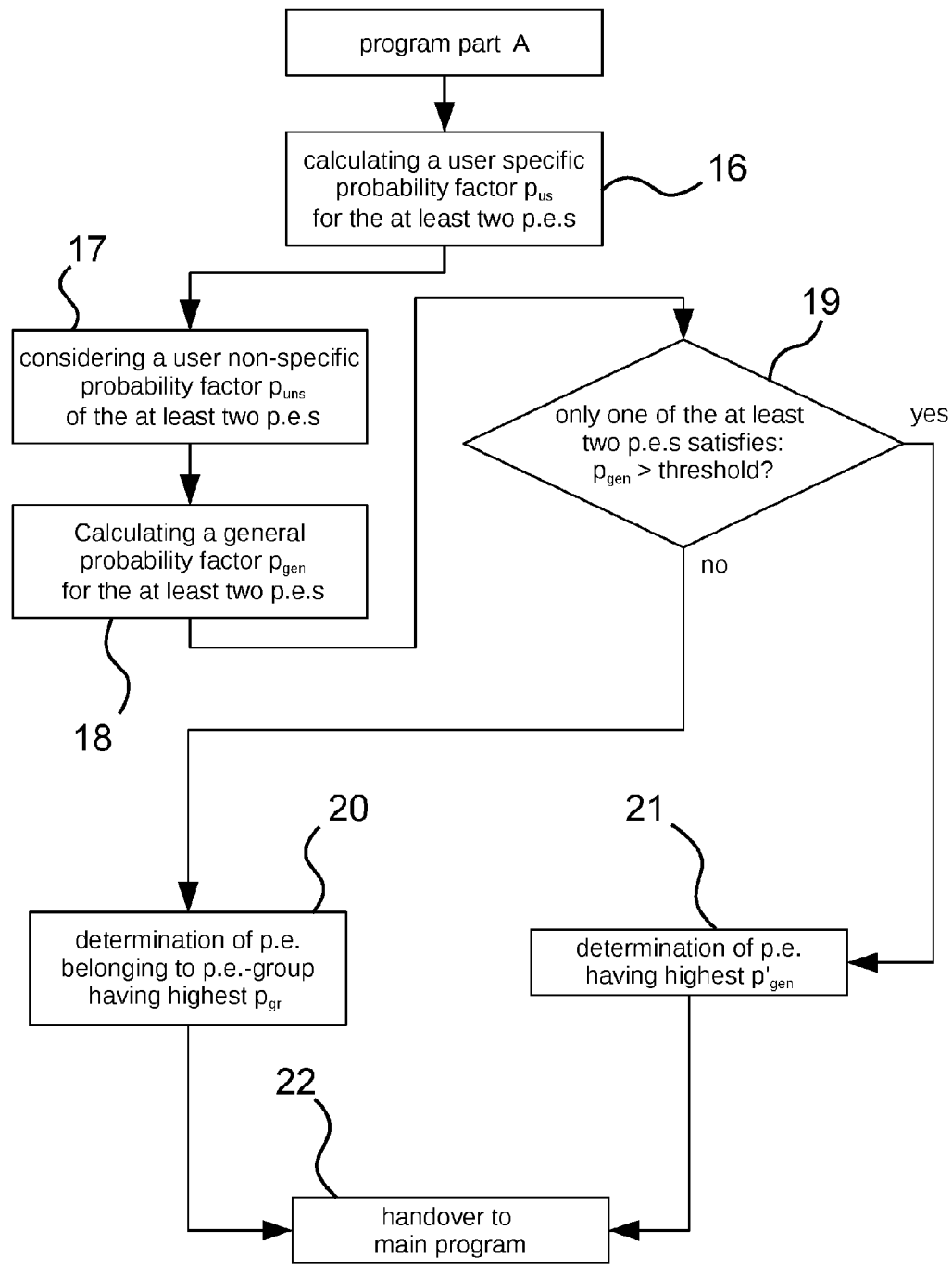
FIG. 3 depicts a flow chart of a program part A.

FIG. 3 illustrates the flow chart of the program part A

Step 16:

A user specific probability factor $p_{us}$ is calculated for each of the at least two physical entities (p.e.s). To this end, the server 3 uses the fourth database. This database interrogates the data base as to all interactions of the user associated with a physical entity belonging to the same physical entity group as each of the at least two physical entities and falls within the limits of the user's standard period. Taking account of these previous interactions of the user, the server 3 calculates the user specific probability factor $p_{us}$ for each of the at least two physical entities on the basis of the number of requests associated with the same service and with a physical entity belonging to the same physical entity group as the physical entity and falling within the limits of the user's standard period.

Step 17:

A user non-specific probability factor puns is calculated for each of the at least two physical entities. Also to this end the server 3 uses the fourth data base of the data storage device 4. Corresponding to each of the at least two physical entities, the server 3 interrogates the data base for interactions of users associated with the physical entity and falling within the limits of the standard period of the respective user. Taking account of these previous interactions of all registered users, the server 3 calculates the user non-specific probability factor $p_{uns}$ for each of the at least two physical entities on the basis of the number of requests associated with the same service and with the physical entity and falling within the limits of the respective user's standard period.

Step 18:

A general probability factor $p_{gen}$ is calculated for the at least two physical entities. The server takes account of the user specific probability factor $p_{us}$ for each of the at least two physical entities, and of the user non-specific probability factor $p_{uns}$ for each of the at least two entities. For calculating the general probability factor $p_{gen}$, on the user specific probability factor $p_{us}$ a greater importance is placed than on the user non-specific probability factor $p_{uns}$. In one embodiment of the present technology the server 3 sends a request to the mobile electronic device 1 for comparing the at least two physical entities with items on the contact list of the mobile electronic device 1. Also contact lists in a social network or in a cloud may be requested. If one of the at least two physical entities can be found in such contact lists, this fact will be considered in the calculation of the general probability factor $p_{gen}$.

Step 19:

The general probability factor $p_{gen}$ of the at least two physical entities is compared with a threshold value. This threshold value may be a predetermined value or it is calculated by the server 3 depending on previous interactions of the user. It will be checked whether the general probability factor $p_{gen}$ of only one of the at least two physical entities is higher than the threshold value. If appropriate, the process is continued with step 21. If this is not appropriate, there are two possible scenarios. In one scenario none of the general probability factors $p_{gen}$ of the at least two physical entities is higher than the threshold value. In the alternative scenario several of the general probability factors $p_{gen}$ of the at least two physical entities are higher than the threshold value. In both scenarios the process is continued in the same way with step 20.

Step 20:

A search as to the physical entity belonging to a group having the highest averaged user non-specific probability factor $p_{gr}$ is conducted. To this end the server 3 checks data of the second data base of the data storage device 4. The physical entity found accordingly will be selected as the most probable physical location of the mobile electronic device 1.

Step 21:

The physical entity having the highest general probability factor $p_{gen}$ is selected as the most probable physical location of the mobile electronic device 1.

Following step 20 and following step 21 the process is continues with step 22.

Step 22:

The process is handed over back to the main program, illustrated in FIG. 2.

Figure 4:
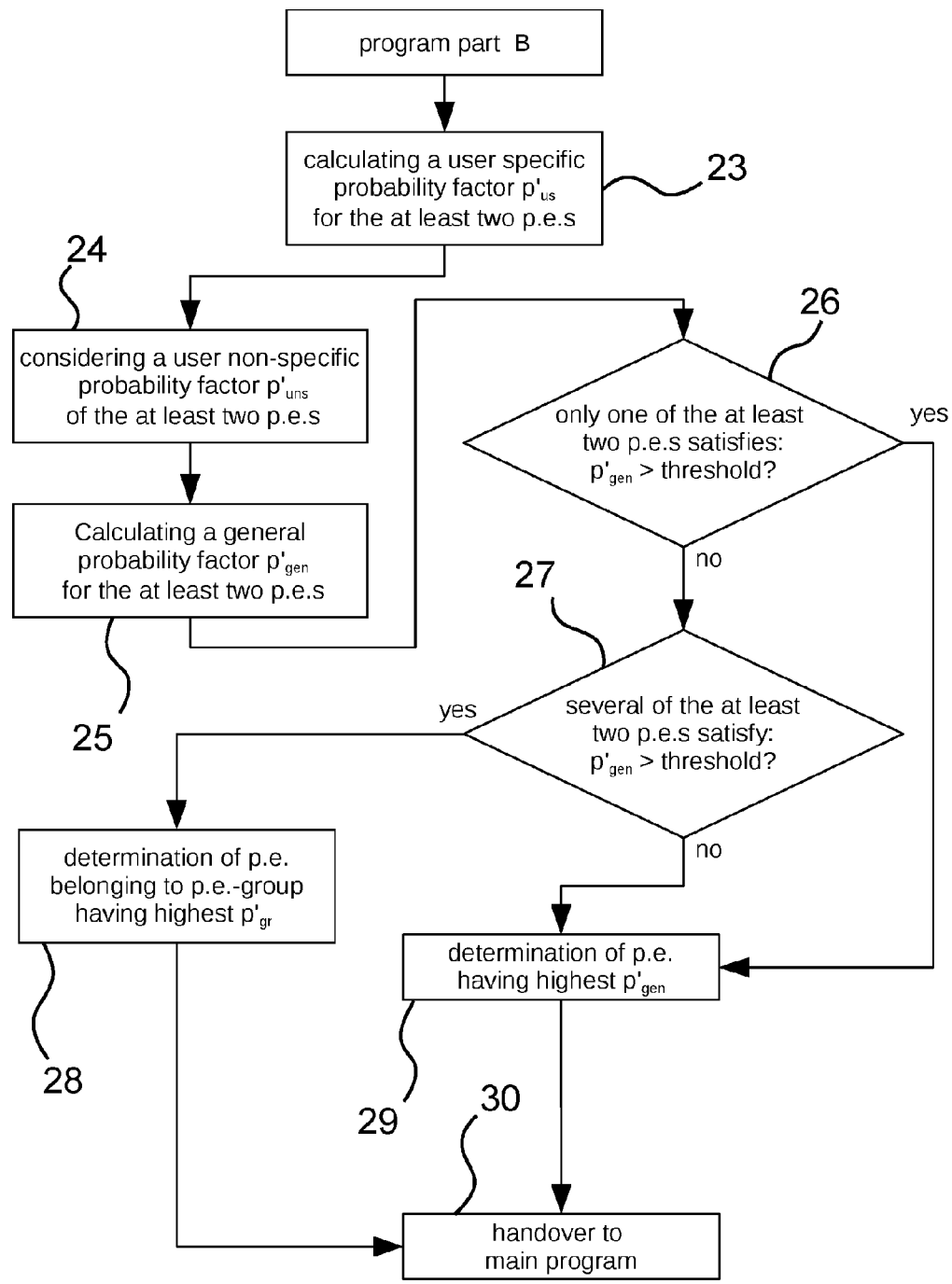
FIG. 4 depicts a flow chart of a program part B.

FIG. 4 illustrates the flow chart of the program part B according the user's interaction falling within the limits of the ad-hoc period of the user.

Step 23:

A user specific probability factor $p'_{us}$ is calculated for each of the at least two physical entities (p.e.s). To this end the server 3 uses the fourth database. It interrogates the data base with respect to all interactions of the user associated with a physical entity belonging to the same physical entity group as each of the at least two physical entities, and falling within the limits of the user's ad-hoc period. Taking account of these previous interactions of the user, the server 3 calculates the user specific probability factor $p'_{us}$ for each of the at least two physical entities on the basis of the numbers of requests associated with the same service and a physical entity belonging to the same physical entity group as the physical entity and falling within the limits of the user's ad-hoc period.

Step 24:

A user non-specific probability factor $p'_{uns}$ is calculated for each of the at least two physical entities. Also to this end the server 3 uses the fourth data base of the data storage device 4. Corresponding to each of the at least two physical entities, the server 3 interrogates the data base with respect to interactions of users associated with the physical entity and falling within the limits of the ad-hoc period of the respective user. Taking account of these previous interactions of all registered users, the server 3 calculates the user non-specific probability factor $p'_{uns}$ for each of the at least two physical entities on the basis of the number of the requests of the same service associated with the physical entity and falling within the limits of the respective user's ad-hoc period.

Step 25:

A general probability factor $p'_{gen}$ is calculated for the at least two physical entities. The server takes account of the user specific probability factor $p'_{us}$ for each of the at least two physical entities and the user non-specific probability factor $p'_{uns}$ for each of the at least two entities. For calculating the general probability factor $p'_{gen}$, the user specific probability factor $p'_{us}$ is regarded to have a higher weight than the user non-specific probability factor $p'_{uns}$. In one embodiment of the present technology the server 3 sends a request to the mobile electronic device 1 for comparing the at least two physical entities with items of the contact list of the mobile electronic device 1. Also contact lists in a social network or in a cloud may be requested. If one of the at least two physical entities can be found in such contact lists, such a thing will be considered in the calculation of the general probability factor $p'_{gen}$.

Step 26:

The general probability factor $p'_{gen}$ of the at least two physical entities is compared with a threshold value. This threshold value may be predetermined, or it is calculated by the server 3 depending on previous interactions of the user.

It will be checked whether the general probability factor $p'_{gen}$ of only one of the at least two physical entities is higher than the threshold value. If appropriate, the process continues with step 29. If such a thing is inappropriate, the process continues with step 27.

Step 27:

There are two possible scenarios. In one scenario none of the general probability factors $p'_{gen}$ of the at least two physical entities is higher than the threshold value. In the alternative scenario several of the general probability factors $p'_{gen}$ of the at least two physical entities are higher than the threshold value. Therefore it is determined whether the general probability factors $p'_{gen}$ of several of the at least two physical entities are higher than the threshold value. If appropriate (the second scenario) the process continues with step 28. If inappropriate the process continues with step 29.

Step 28:

A search as to the physical entity belonging to a group having the highest averaged user non-specific probability factor $p'_{gr}$ is conducted. To this end the server 3 checks data of the second data base of the data storage device 4. The physical entity found accordingly will be selected as the most probable physical location of the mobile electronic device 1.

Step 29:

The physical entity having the highest general probability factor $p'_{gen}$ is selected as the most probable physical location of the mobile electronic device 1.

Following step 28 and following step 29 the process continues with step 30.

Step 30:

The process is handed over back to the main program, illustrated in FIG. 2.

When the physical location of the mobile electronic device 1 and the associated physical entity have been determined in step 15 of the main program according to the flow chart in FIG. 2, the server 3 will check for the associated address of the physical entity in the first data base of the data storage device 4. Depending on the service appropriate data may be sent to the mobile electronic device 1, or to a different mobile electronic device via the mobile network 6, or to the desktop computer 5 via the communication network 7.

The server 3 sends data representing the selected physical entity and the associated address on a map on the display of one of the above mentioned devices (the mobile electronic device 1, a different mobile electronic device or the desktop computer 5). In one embodiment of the present technology, the selected physical entity has to be confirmed by the user 2.

Figure 5:
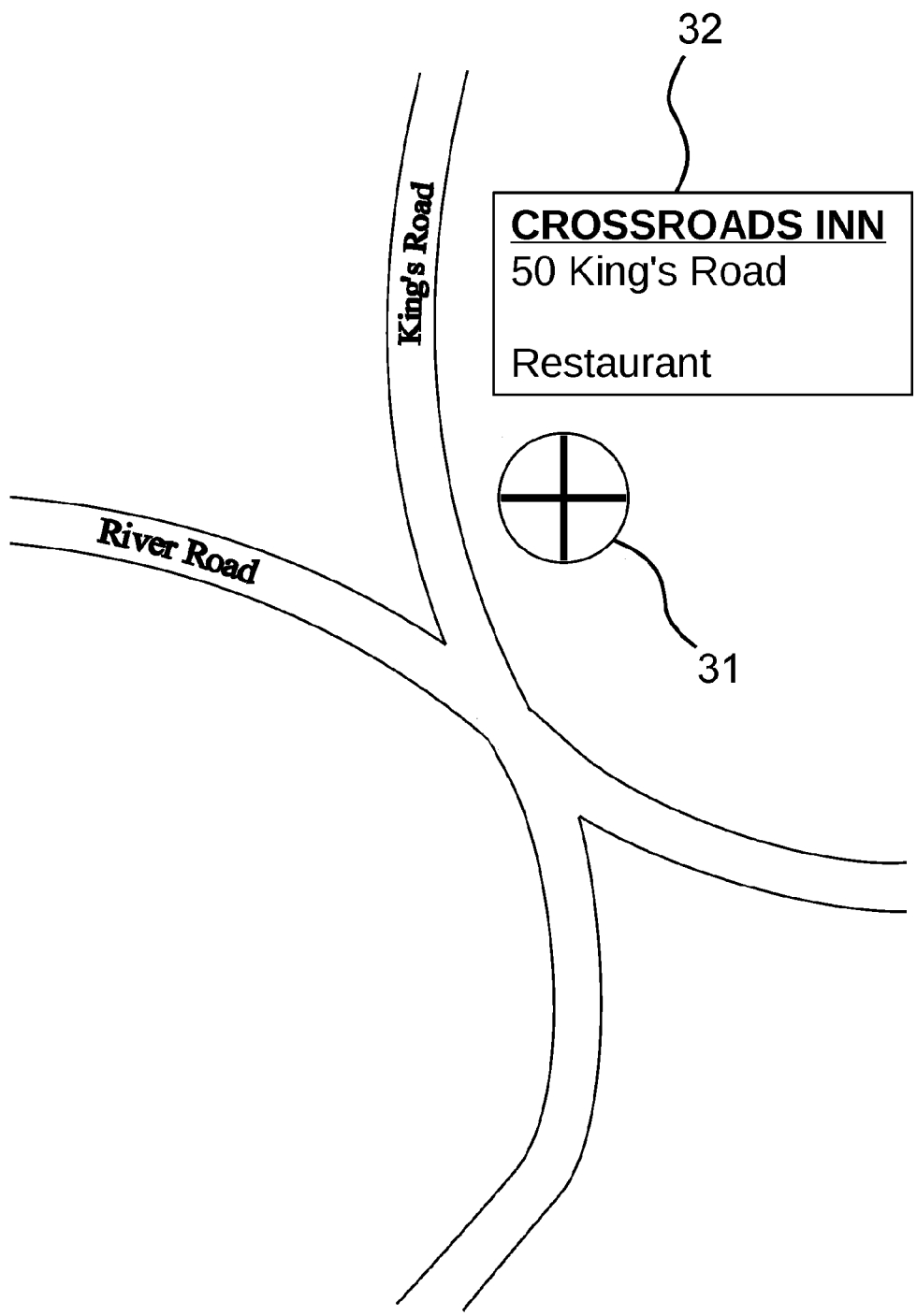
FIG. 5 depicts a representation of a selected physical entity and the associated address on a map displayed on a stationary or a mobile electronic device.

FIG. 5 illustrates an example for the representation of the selected physical entity and the associated address on a map displayed, for example, on the mobile electronic device 1. The physical location of the mobile electronic device 1 is shown as a circle 31 having a cross inside. The text box 32 includes the name and address of the selected physical entity. Further, it includes the classification of the group of physical entities and the selected physical entity which belongs thereto. In this example, the "CROSSROADS INN" is a restaurant. The server 3 obtains the data from the first data base and the second data base.

When the most probable physical location associated with a physical entity is selected (and is confirmed by the user according to one embodiment of the present technology), the respective data in the data bases have to be amended. In the first data base the user non-specific probability factor assigned to the selected physical entity, will be recalculated and restored for the appropriate time period. In the second data base the averaged user non-specific probability factor assigned to the group of physical entities the selected physical entity belongs to, will also be recalculated and restored for the appropriate time period. Finally, a new entry is created in the fourth data base comprising name or ID of the user, the user's time period in which the service was requested, the selected physical entity and the kind of interaction or kind of service.

Accordingly, some embodiments of the present technology have been described above and can be summarized as follows, structured as numbered clauses.

CLAUSE 1. A method of determining an address corresponding to a most probable physical location of an electronic device (1) associated with a user (2), the method being executable on a computer device (3) and comprising: receiving geolocation data from the electronic device (9); based on received geolocation data, finding at least two probable physical locations of the electronic device, with each of the at least two probable physical locations corresponding to a physical entity, with each physical entity being selected from a predetermined list and associated with a physical entity type (12); establishing, with respect to the at least two physical entities, a user interaction history; based on the user interaction history, calculating for each physical entity a user specific probability factor, which factor being indicative of a likelihood of the user interacting with each physical entity associated with a respective physical entity type and corresponding to a respective one of the at least two probable physical locations (16; 23); establishing, with respect to each physical entity, a user non-specific probability factor based on statistical information representative of previous interactions of other users and indicative of the likelihood of the other users interacting with each physical entity associated with the respective physical entity type and corresponding to the respective one of the at least two physical locations (17; 24);

calculating, for each physical entity, a general probability factor based on the user specific probability factor and the user non-specific probability factor (18; 25); selecting one of the at least two physical entities, having the highest general probability factor, as the most probable physical location of the electronic device, and retrieving an address associated with the selected physical entity (21; 29); representing the selected physical entity (31) and/or the associated address (32) on a map displayed on a stationary (5) or a mobile electronic device (1).

CLAUSE 2. The method of clause 1, wherein: selecting one of the at least two physical entities including the step of comparing the general probability factor with a predetermined threshold value (19; 26; 27).

CLAUSE 3. The method of clause 2, wherein: selecting one of the at least two physical entities if the general probability factor of one of the at least two physical entities is higher than the predetermined threshold value (19; 26).

CLAUSE 4. The method of clause 2, wherein: selecting one of the at least two physical entities satisfying the following conditions: the general probability factor of several of the at least two physical entities is higher than the predetermined threshold value (27), and the physical entity belongs to a group of physical entities associated with the physical entity type having the highest averaged user non-specific probability factor (28).

CLAUSE 5. The method of clause 2, wherein; selecting one of the at least two physical entities satisfying the following conditions: the general probability factor of none of the at least two physical entities is higher than the predetermined threshold value (27), the user's interaction is during an ad hoc time period of the user and the physical entity has the highest general probability factor (29).

CLAUSE 6. The method of clause 2, wherein: selecting one of the at least two physical entities satisfying the following conditions: the general probability factor of none of the at least two physical entities is higher than the predetermined threshold value (19), the user's interaction is during a standard time period of the user, and the physical entity belongs to a group of physical entities associated with the physical entity type having the highest averaged user non-specific probability factor (20).

CLAUSE 7. The method of clause 1, wherein: calculating the user specific probability factor (16; 23), the user non-specific probability factor (17; 24) and the general probability factor (18; 25) by taking into account the time period of the user's interaction (14).

CLAUSE 8. The method of clause 7, wherein: the time period of the user's interaction comprising a users standard time period or a user's ad hoc time period.

CLAUSE 9. The method of clause 1, wherein: storing data of user's interactions together with data associated with the selected physical entity in a data base; the stored data comprising time and date of the interaction and the allocation of the time thereof to the user's standard time period or to the user's ad hoc time period.

CLAUSE 10. The method of clause 9, wherein: the data base being connected to the computer device (3).

CLAUSE 11. The method of clause 9, wherein: the data of user's interactions with a physical entity being stored in correlation to the user (2) and in correlation to the physical entity.

CLAUSE 12. The method of clause 11, wherein: calculating the user non-specific probability factor (17; 24) correlated to a physical entity from the data stored in correlation to the physical entity, storing the calculated user non-specific probability factor in correlation to the physical entity, and recalculating and restoring the user non specific factor in correlation to the physical entity for each interaction of a user (2) with the physical entity.

CLAUSE 13. The method of clause 1, wherein: using a geo-sensor of the electronic device (1) for generating the geolocation data received by the computer device (3).

CLAUSE 14. The method of clause 1, wherein: the predetermined list comprising physical entities associated with physical entity types thereof and the associated geolocation data of the physical entities being stored in a data base.

CLAUSE 15. The method of clause 14, wherein: the data base being connected to the computer device (3).

CLAUSE 16. The method of clause 11, wherein: calculating the user specific probability factor (16; 23) for the physical entity, while taking into account of the data of user's interactions with the physical entity having been stored and allocated to the user.

CLAUSE 17. The method of clause 16, wherein: calculating the user specific probability factor (16; 23) for the physical entity, while taking into account of the data of user's interactions with physical entities belonging to a group of physical entities assigned to the physical entity type and having been stored and allocated to the user.

CLAUSE 18. The method of clause 17, wherein: calculating the user specific probability factor (16; 23) for the physical entity, while taking into account the contact list of the electronic device (1) and/or a contact list of a social network.

CLAUSE 19. The method of clause 1, further comprising: asking for confirmation by the user (2) as to the selected physical entity.

CLAUSE 20. The method of clause 1, further comprising: sending a taxi to the address (32) associated with the selected physical entity (31).

CLAUSE 21. A system for determining an address corresponding to a most probable physical location of an electronic device (1) associated with a user (2), the system comprising a computer device (3) having a processor and a computer suitable information storage medium communicating with the processor and storing instructions causing the system to perform the steps of: receiving geolocation data from the electronic device (9); based on received geolocation data, finding at least two probable physical locations of the electronic device, with each of the at least two probable physical locations corresponding to a physical entity, with each physical entity being selected from a pre-determined list and associated with a physical entity type (12); establishing, with respect to the at least two physical entities, a user interaction history; based on the user interaction history, calculating for each physical entity a user specific probability factor, which factor being indicative of a likelihood of the user interacting with each physical entity associated with a respective physical entity type and corresponding to a respective one of the at least two probable physical locations (16; 23); establishing, with respect to each physical entity, a user non-specific probability factor based on statistical information representative of previous interactions of other users and indicative of the likelihood of the other users interacting with each physical entity associated with the respective physical entity type and corresponding to the respective one of the at least two physical locations (17; 24); calculating, for each physical entity, a general probability factor based on the user specific probability factor and the user non-specific probability factor (18; 25); selecting one of the at least two physical entities, having the highest general probability factor, as the most probable physical location of the electronic device, and retrieving an address associated with the selected physical entity (21; 29); sending the selected physical entity (31) and/or the associated address (32) to a stationary (5) or a mobile electronic device (1).

CLAUSE 22. The system of clause 21, wherein: the computer device (3) selecting one of the at least two physical entities including the step of comparing the general probability factor with a predetermined threshold value (19; 26; 27).

CLAUSE 23. The system of clause 22, wherein: the computer device (3) selecting one of the at least two physical entities if the general probability factor of one of the at least two physical entities is higher than the predetermined threshold value (19; 26).

CLAUSE 24. The system of clause 22, wherein: the computer device (3) selecting one of the at least two physical entities satisfying the following conditions: the general probability factor of several of the at least two physical entities is higher than the predetermined threshold value (27), and the physical entity belongs to a group of physical entities associated with the physical entity type having the highest averaged user non-specific probability factor (28).

CLAUSE 25. The system of clause 22, wherein: the computer device (3) selecting one of the at least two physical entities satisfying the following conditions: the general probability factor of none of the at least two physical entities is higher than the predetermined threshold value (27), the user's interaction is during an ad hoc time period of the user and the physical entity has the highest general probability factor (29).

CLAUSE 26. The system of clause 22, wherein; the computer device (3) selecting one of the at least two physical entities satisfying the following conditions: the general probability factor of none of the at least two physical entities is higher than the predetermined threshold value (19), the user's interaction is during a standard time period of the user, and the physical entity belongs to a group of physical entities associated with the physical entity type having the highest averaged user non-specific probability factor (20).

CLAUSE 27. The system of clause 21, wherein: the computer device (3) calculating the user specific probability factor (16; 23), the user non-specific probability factor (17; 24) and the general probability factor (18; 25) by taking into account the time period of the user's interaction (14).

CLAUSE 28. The system of clause 21 further comprising: a data storage device (4) capable of storing a data base and being connected to the computer device (3), the data base containing data of user's interactions together with data associated with the selected physical entity in the data base; the stored data comprising time and date of the interaction and the allocation of the time thereof to the user's time period, comprising a user's standard time period and a user's ad hoc time period.

CLAUSE 29. The system of clause 28, wherein: the data base containing data of user's interactions with a physical entity in correlation to the user and in correlation to the physical entity.

CLAUSE 30. The system of clause 28, wherein: the data base containing the predetermined list comprising physical entities associated with physical entity types thereof and the associated geolocation data of the physical entities.

CLAUSE 31. The system of clause 21 wherein: the computer device (3) sending a request for confirmation by the user (2) as to the selected physical entity to the electronic device (1).

CLAUSE 32. The system of clause 28 wherein: the computer device (3) being connected to the data storage device (4) via a communication network (7).

CLAUSE 33. The system of clause 21 wherein: the computer device (3) being connected to the electronic device (1) via a mobile network (6).

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

One skilled in the art will appreciate when the instant description refers to "receiving data" from a user that the electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of determining an address corresponding to a most probable physical location of an electronic device associated with a user, the method being executable on a computer device, the method comprising:
   receiving geolocation data from the electronic device, the geolocation data being associated with a predetermined radius;
   based on the received geolocation data and the associated predetermined radius, determining at least two probable physical locations of the electronic device, the at least two probable physical locations being within the predetermined radius associated with the geolocation data, the at least two probable physical locations including a first probable physical location and a second probable physical location, the first probable physical location corresponding to a first physical entity selected from a predetermined list and associated with a first physical entity type, the first physical entity type being indicative of a first type of business, and the second probable physical location corresponding to a second physical entity selected from the predetermined list and associated with a second physical entity type, the second physical entity type being indicative of a second type of business;
   based on the first physical entity type and the second physical entity type, retrieving an interaction history of the user with the first physical entity, the second physical entity, other physical entities of the first physical entity type, and other physical entities of the second physical entity type;
   based on the interaction history of the user, calculating for the first physical entity a first user specific probability factor indicative of a likelihood of the user interacting with the first physical entity and calculating for the second physical entity a second user specific probability factor indicative of a likelihood of the user interacting with the second physical entity;
   based on the first physical entity type and the second physical entity type, retrieving an interaction history of other users with other physical entities of the first physical entity type and other physical entities of the second physical entity type;
   based on the interaction history of the other users, calculating for the first physical entity a first user non-specific probability factor indicative of the likelihood of the other users interacting with the first physical entity and calculating for the second physical entity a second user non-specific probability factor indicative of the likelihood of the other users interacting with the second physical entity;
   based on the first user specific probability factor and the first user non-specific probability factor, calculating a first general probability factor associated with the first probable physical location;
   based on the second user specific probability factor and the second user non-specific probability factor, calculating a second general probability factor associated with the second probable physical location;
   determining a highest general probability factor among the first general probability factor and the second general probability factor;
   selecting one of the first probable physical location and the second probable physical location being associated with the highest general probability factor as a most probable physical location of the electronic device, the most probable physical location being associated with a selected physical entity, the selected physical entity being a respective one of the first physical entity and the second physical entity;
   retrieving an address associated with the selected physical entity; and
   showing at least one of the selected physical entity and the address associated with the selected physical entity on a map displayed on at least one of the electronic device and a different electronic device.

2. The method of claim 1, further comprising:
   selecting one of the first probable physical location and the second probable physical location as the most probable physical location if the one of the first general probability factor and the second general probability factor is higher than a predetermined threshold value.

3. The method of claim 1, the method further comprising: selecting one of the first probable physical location and the second probable physical location as the most probable physical location if:
   the first general probability factor and the second general probability are higher than a predetermined threshold value; and
   the one of the first probable physical location and the second probable physical location is associated with the one of the first physical entity type and the second physical entity type having a highest averaged user non-specific probability factor.

4. The method of claim 1, further comprising: selecting one of the first probable physical location and the second probable physical location as the most probable physical location if:
   the first general probability factor and the second general probability factor are lower than a predetermined threshold value;
   the user's interaction is during an ad hoc time period of the user; and the one of the first probable physical location and the second probable physical location is associated with the one of the first physical entity type and the second physical entity type having the highest general probability factor.

5. The method of claim 1, further comprising:
   selecting one of the first probable physical location and the second probable physical location as the most probable physical location if:
   the first general probability factor and the second general probability factor are lower than a predetermined threshold value;

the user's interaction is during a standard time period of the user; and the one of the first probable physical location and the second probable physical location is associated with the one of the first physical entity type and the second physical entity type having a highest averaged user non-specific probability factor.

6. The method of claim 1, wherein in calculating the first and second user specific probability factors, the first and second user non-specific probability factors and the first and second general probability factors, a time period of the user's interaction is taken into account.

7. The method of claim 6, wherein: the time period of the user's interaction comprises one of the user's standard time period or the user's ad hoc time period.

8. The method of claim 1, further comprising: storing data of the user's interactions with the selected physical entity together with previous data associated with the selected physical entity in a database, the data of the user's interaction comprising a time and a date of the user's interactions and an allocation of a time thereof to one of the user's standard time period and the user's ad hoc time period.

9. The method of claim 8, wherein: the database is connected to the computer device.

10. The method of claim 8, wherein: the data of the user's interactions with the selected physical entity is stored in association with the user and in association with the selected physical entity.

11. The method of claim 10, further comprising:
recalculating the one of the first user non-specific probability factor and the second user non-specific probability factor that is associated with the selected physical entity by taking into account the data of the user's interactions with the selected physical entity; and
storing the recalculated one of the first user non-specific probability factor and the second user non-specific probability factor in the database.

12. The method of claim 1, wherein: a geo-sensor of the electronic device is used for generating the geolocation data received by the computer device.

13. The method of claim 1, wherein: the predetermined list comprising the first and second physical entities associated with the first and second physical entity types, respectively, and the associated geolocation data of the first and second physical entities are stored in a database.

14. The method of claim 13, wherein: the database is connected to the computer device.

15. The method of claim 1, wherein: in calculating the first and second user specific probability factors for the first and second physical entities, respectively, at least one of a contact list of the electronic device and a contact list of a social network is taken into account.

16. The method of claim 1, further comprising:
requesting confirmation by the user as to the selected physical entity.

17. The method of claim 1, further comprising: sending a taxi to the address associated with the selected physical entity.

18. The method of claim 1, wherein the first physical entity type and the second physical entity type are associated respectively with a first physical entity type group ID and a second physical entity type group ID.

19. A system for determining an address corresponding to a most probable physical location of an electronic device associated with a user, the system comprising a computer device having a processor and a non-transitory computer suitable information storage medium communicating with the processor and storing instructions causing the system to perform the steps of:

receiving geolocation data from the electronic device, the geolocation data being associated with a predetermined radius;

based on the received geolocation data and the associated predetermined radius, determining at least two probable physical locations of the electronic device, the at least two probable physical locations being within the predetermined radius associated with the geolocation data, the at least two probable physical locations including a first probable physical location and a second probable physical location, the first probable physical location corresponding to a first physical entity, selected from a pre-determined list and associated with a first physical entity type, the first physical entity type being indicative of a first type of business, and the second probable physical location corresponding to a second physical entity selected from the predetermined list and associated with a second physical entity type, the second physical entity type being indicative of a second type of business;

based on the first physical entity type and the second physical entity type, retrieving an interaction history of the user with the first physical entity, the second physical entity, other physical entities of the first physical entity type, and other physical entities of the second physical entity type;

based on the interaction history of the user, calculating for the first physical entity a first user specific probability factor indicative of a likelihood of the user interacting with the first physical entity and calculating for the second physical entity a second user specific probability factor indicative of a likelihood of the user interacting with the second physical entity;

based on the first physical entity type and the second physical entity type, retrieving an interaction history of other users with other physical entities of the first physical entity type and other physical entities of the second physical entity type;

based on the interaction history of the other users, calculating for the first physical entity a first user non-specific probability factor indicative of the likelihood of the other users interacting with the first physical entity and calculating for the second physical entity a second user non-specific probability factor indicative of the likelihood of the other users interacting with the second physical;

based on the first user specific probability factor and the first user non-specific probability factor, calculating a first general probability factor associated with the first probable physical location;

based on the second user specific probability factor and the second user non-specific probability factor, calculating a second general probability factor associated with the second probable physical location;

determining a highest general probability factor among the first general probability factor and the second general probability factor;

selecting one of the first probable physical location and the second probable physical location being associated with the highest general probability as a most probable physical location of the electronic device, the most probable physical location being associated with a selected physical entity, the selected physical entity being the one of the first physical entity and the second physical entity;

retrieving an address associated with the selected physical entity; and sending at least one of the selected physical entity and the address associated with the selected physical entity to at least one of the electronic device and a different electronic device.

20. The system of claim 19, further configured to perform the step of: in selecting one of the first probable physical location and the second probable physical location as the most probable physical location, comparing the first general probability factor and the second general probability factor with a predetermined threshold value.

* * * * *